United States Patent [19]

Ema

[11] Patent Number: 5,095,906
[45] Date of Patent: Mar. 17, 1992

[54] IMAGE PROCESSING SYSTEM
[75] Inventor: Takehiro Ema, Ootawara, Japan
[73] Assignee: Kabushiki Kaisha Toshiba, Kawasaki, Japan
[21] Appl. No.: 635,374
[22] Filed: Jan. 2, 1991

Related U.S. Application Data

[63] Continuation of Ser. No. 248,843, Sep. 26, 1988, abandoned.

[30] Foreign Application Priority Data

Sep. 30, 1987 [JP] Japan .................... 62-247289
Feb. 17, 1988 [JP] Japan .................... 63-32633

[51] Int. Cl.$^5$ ............................. A61B 6/00
[52] U.S. Cl. .................... 128/653.1 R; 358/111;
378/99; 364/413.15; 364/413.23
[58] Field of Search ............... 128/653 R, 653.1, 654,
128/659; 358/111; 378/99; 364/413.13, 413.14,
413.15, 413.23

[56] References Cited

U.S. PATENT DOCUMENTS

| | | | |
|---|---|---|---|
| 4,436,095 | 3/1984 | Kruger | 128/654 |
| 4,444,196 | 4/1984 | Stein | 128/654 |
| 4,533,946 | 8/1985 | Yasuhara et al. | 358/111 |
| 4,544,948 | 10/1985 | Okazaki | 358/111 |
| 4,548,204 | 10/1985 | Groch et al. | 128/700 |
| 4,633,307 | 12/1986 | Honda | 358/111 |
| 4,729,379 | 3/1988 | Ohe | 128/654 |
| 4,739,766 | 4/1988 | Riederer | 128/653 AF |
| 4,837,796 | 6/1989 | Ema | |
| 5,031,620 | 7/1991 | Oe | 128/653 R |

FOREIGN PATENT DOCUMENTS 0224253 3/1987 World Int. Prop. O.

OTHER PUBLICATIONS

A Technique For Motion Correction in Dynamic Scintigraphy, J. S. Fleming, in European Journal of Nuclear Medicine, Springer Verlag 1984, No. 9, pp. 397 to 402.
X-Ray Imaging System, T. Ema, 07/077,519, filed July 24, 1987.
X-Ray Image Processing Apparatus, T. Ema, 07/066,093, filed Jun. 24, 1987.

*Primary Examiner*—Lee S Cohen
*Assistant Examiner*—Krista M. Pfaffle
*Attorney, Agent, or Firm*—Finnegan, Henderson, Farabow, Garrett and Dunner

[57] ABSTRACT

An image processing apparatus comprises an image data acquisition section, a variation detecting section, a selecting section, and a storage section. The image data acquisition section acquires a series of image data groups including a time-varying element of a subject under examination. The variation detecting section detects a variation of the varying element in the series of image data groups. The selecting section selects a desired image data group out of the image data groups on the basis of the variation detected by the detecting section. The storage section stores the desired image data selected by the selecting section.

13 Claims, 17 Drawing Sheets

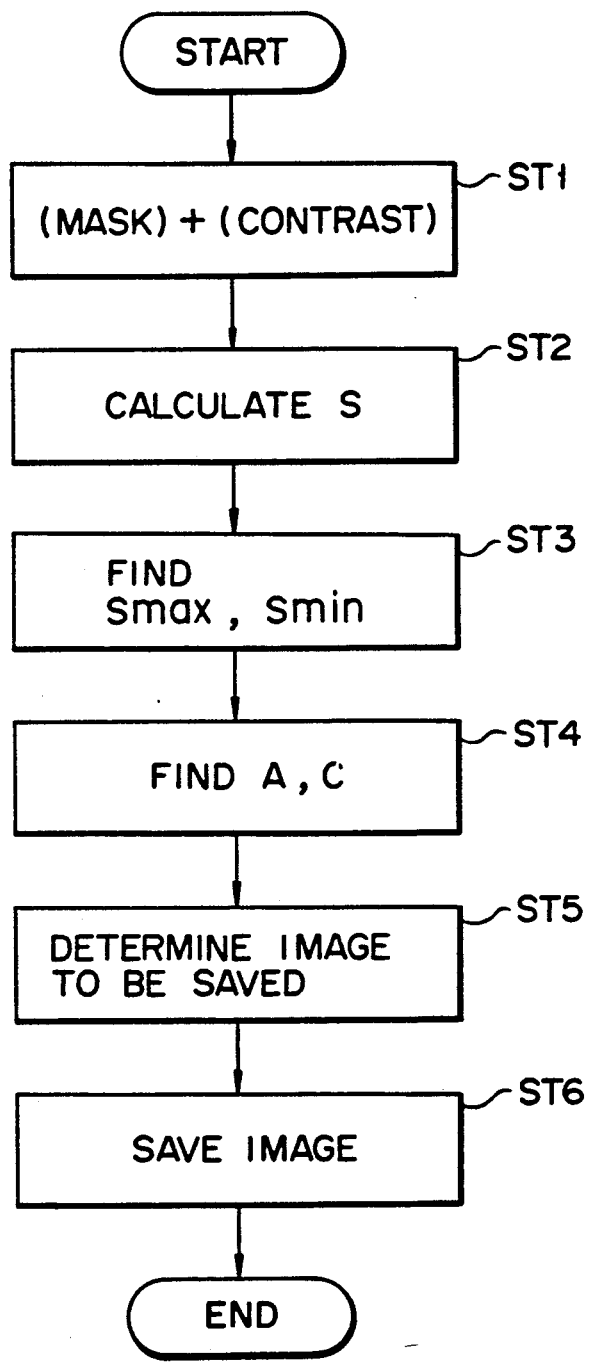
F I G. 4

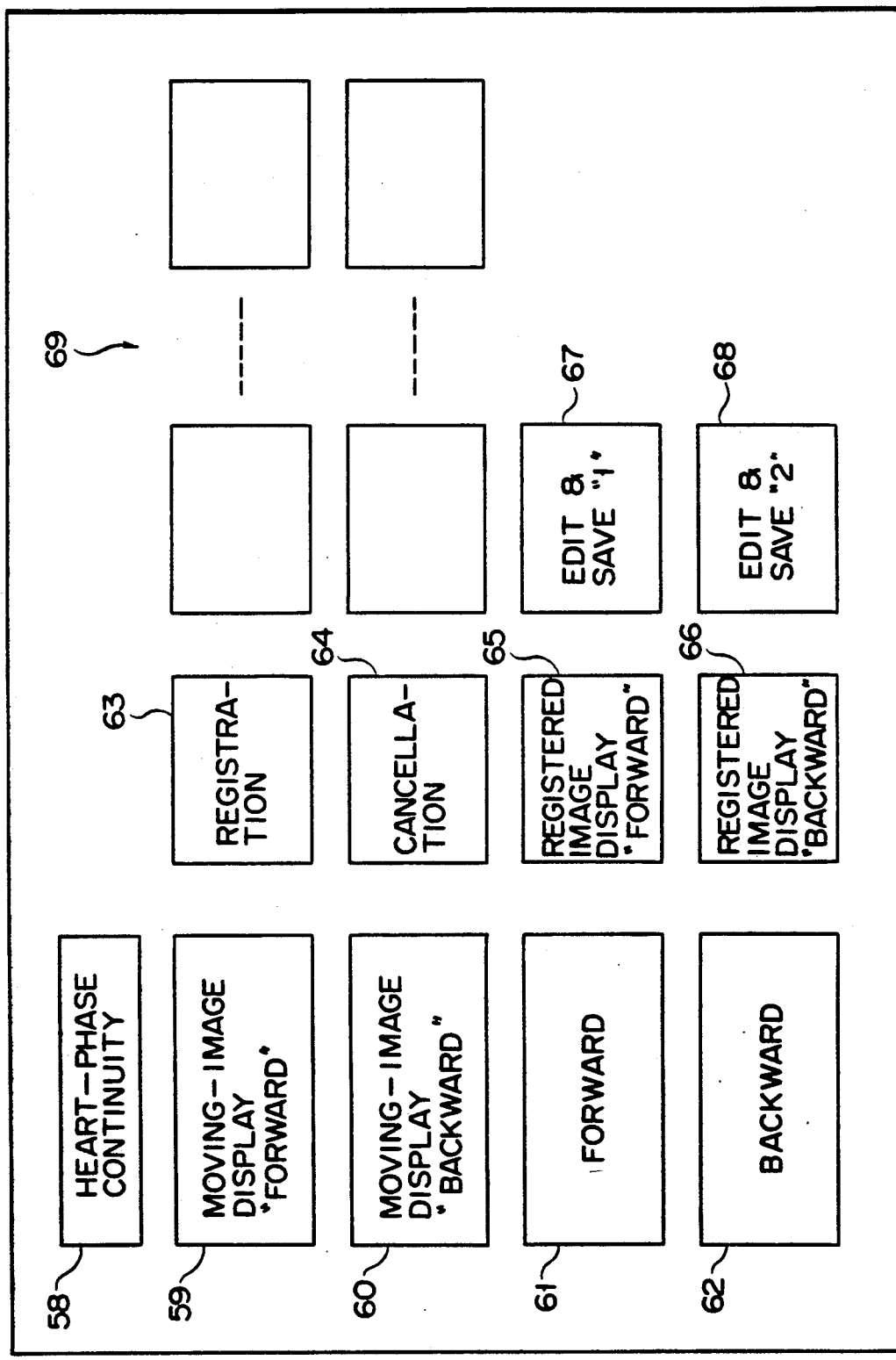

| IMAGE NUMBER | REGISTRATION FLAG |
|---|---|
| 1 | 0 |
| 2 | 0 |
| ⋮ | ⋮ |
| 19 | 0 |
| 20 | 1 |
| 21 | 0 |
| ⋮ | ⋮ |
| 42 | 0 |
| 43 | 1 |
| 44 | 0 |
F I G. 14
| IMAGE NUMBER | RELATIVE TIME-POSITION IN ONE HEARTBEAT CYCLE |
|---|---|
| 1 | 0.040 |
| 2 | 0.082 |
| ⋮ | ⋮ |
| 25 | 0.931 |
| 26 | 0.977 |
| 27 | 0.013 |
| 28 | 0.054 |
| ⋮ | ⋮ |
F I G. 15
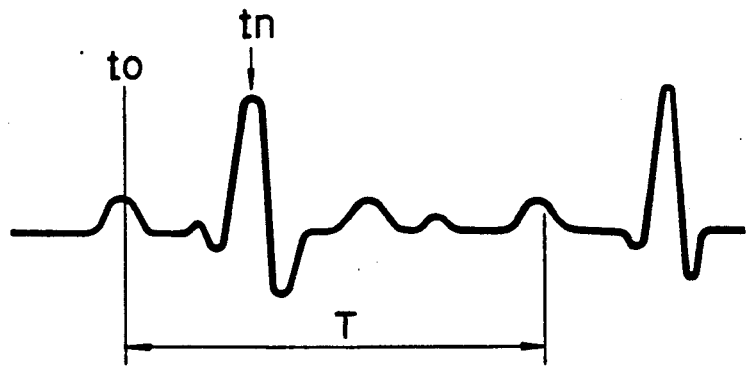
F I G. 16

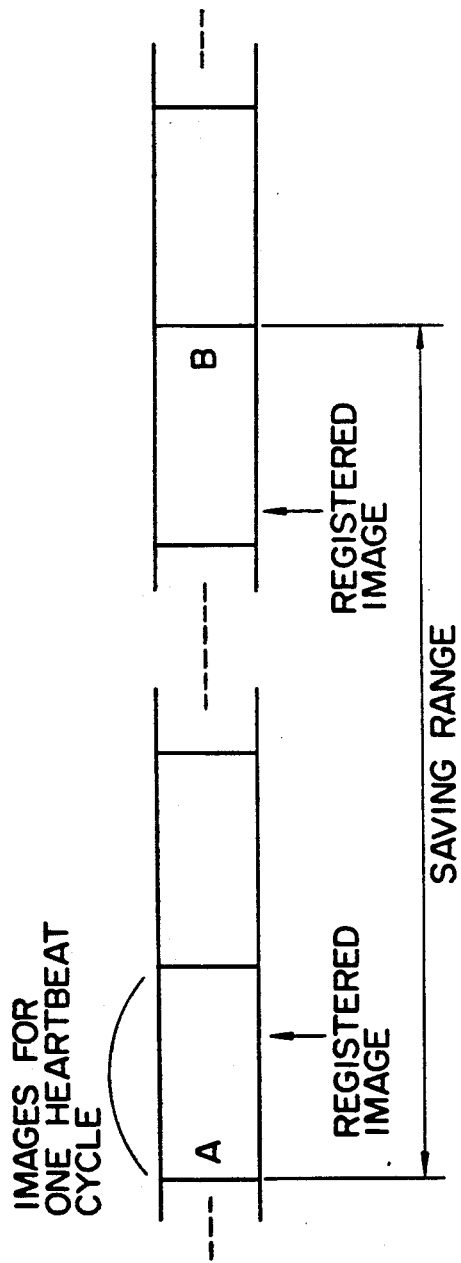
F I G. 17
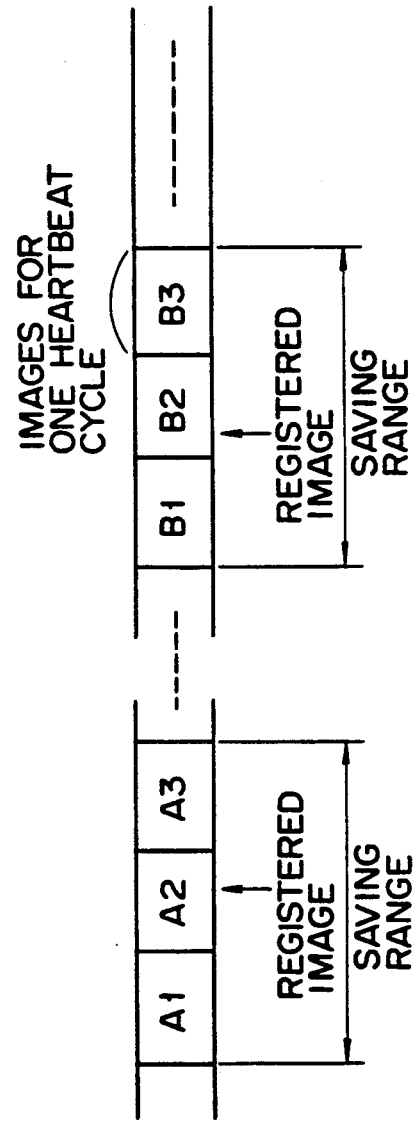
F I G. 18

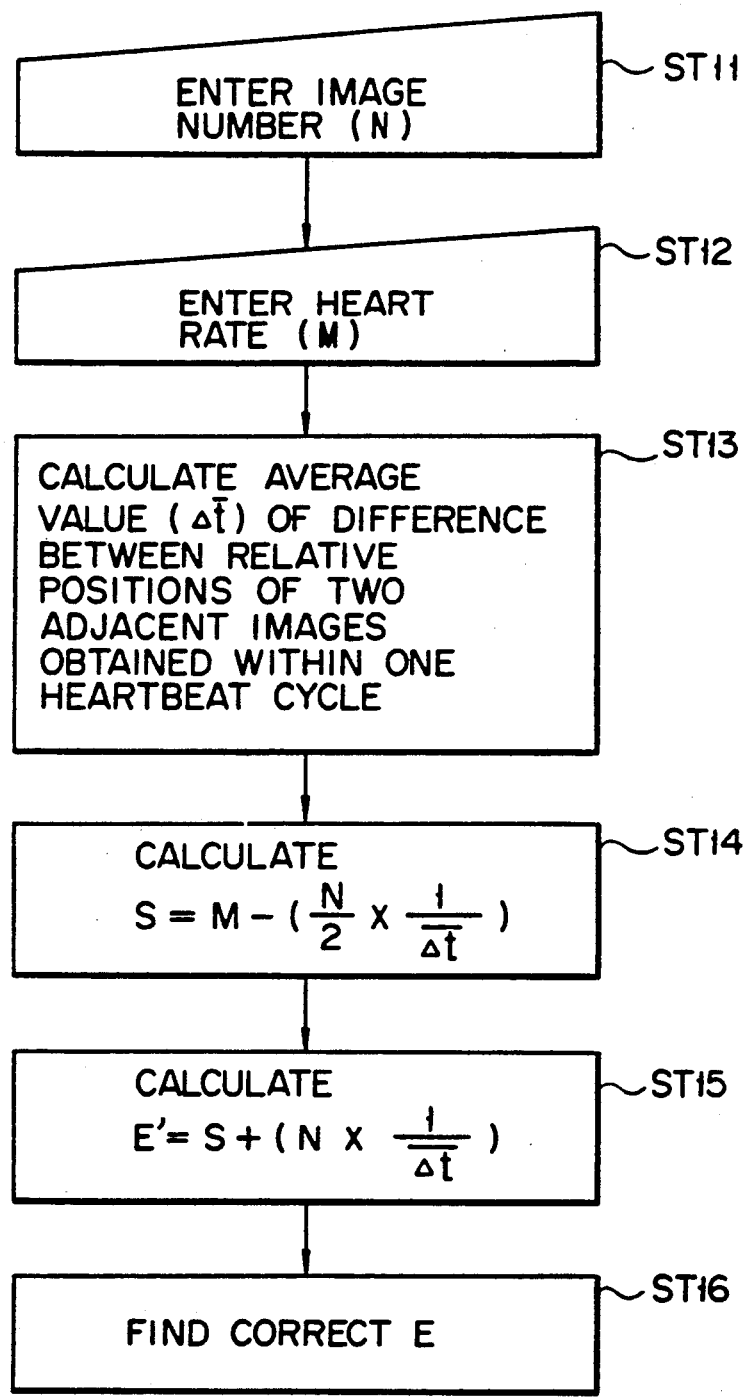
F I G. 19

IMAGE PROCESSING SYSTEM

This application is a continuation of application Ser. No. 07/248,843, filed Sept. 26, 1988, now abandoned.

BACKGROUND OF THE INVENTION

1. Field of the Invention

The present invention relates to an image processing apparatus well suited for use with a system adapted chiefly for saving and communicating medical image information and, more particularly, to an image processing apparatus for editing and storing image information including moving-image information.

2. Description of the Related Art

In recent years, by saving and communicating medical image information in digital form, efficient storage and utilization of the medical information has been put into practice. With such a system, a data base is built for digital images. A digital image is retrieved from the data base and then displayed on a display for diagnosis. In particular, serial moving images, such as blood-vessel contrasted images, are saved as a large number of still images, and the still images are serially reproduced to display the moving images.

FIG. 1 shows an example of an arrangement of the picture archiving and communication system (abbreviated as "PACS" hereinafter) used mainly for custody and communication of medical images.

The PACS comprises modalities (image acquiring equipment) IE1 - IEm, data bases MDB1 - MDBm for modalities IE1 - IEm, network interface units NIU, a star coupler SC, a network data base DB, a work station WS and a data base WDB for work station WS.

Each of modalities IE1 - IEm may be comprised of an existing medical imaging apparatus, such as an X-ray imaging device, a magnetic-resonance imaging apparatus or an ultrasonic diagnostic apparatus. A series of images (diagnostic images of a subject under examination) acquired by modalities IE1 - IEm are stored in data bases MDB1 - MDBm, respectively. A star network is formed with star coupler SC at its center, and image data transfers are performed through the star network. Work station WS is equipped with a CRT display and an operator console. Images specified on the console are transferred from modality data bases MDB1 - MDBm to work station data base WDB and are appropriately displayed on the CRT display of work station WS. An examination of these images is performed by a doctor at work station.

Usually, all the diagnostic images of a patient are used for examination. A series of the diagnostic images may include images to be saved and images which need not be saved. That is, when, like the moving images as described above, a plurality of still images are used for an examination, there is a good possibility that all the still images need not be saved. In this case, therefore, only the images considered to be worthy of saving by the doctor are transferred from work station data base WDB to network data base DB for storage therein.

Moving images contain a vast quantity of data in contrast to a usual still image. For example, if an image of $512 \times 512 \times 12$ bits is acquired for 8 seconds at a rate of 30 frames per second, then the data quantity will amount to 90 Mbits. On the other hand, even if a still image on an X-ray film is digitized in the form of $2048 \times 2048 \times 12$ bits, the data quantity is as little as 6 Mbits. Thus, when moving images are to be saved in digital form, it is desirable to save only the necessary images.

In present circumstances, the determination of images to be saved among moving images relies upon human judgement.

To determine a range of images to be saved, an operator, such as a photographic engineer or a doctor, actually displays moving images on a CRT display and confirms, while watching the display, image numbers of the first and final ones of the moving images to be saved. Among images IMG, those which are to be saved can be specified by designating the first image IMG$i$ and the number of the following images or the first image IMG$i$ and the final image IMG$i+j$ as shown in FIG. 2.

As described above, the operation of selecting images to be saved among all the images acquired imposes a heavy burden on the operator especially when there are many images to be handled.

SUMMARY OF THE INVENTION

It is accordingly an object of the present invention to provide, an image processing apparatus which is easily selects image information to be saved among moving-image information and thus can alleviate a burden imposed on an operator.

An image processing apparatus of the present invention comprises an image data acquisition section, a variation detecting section, a selecting section, and a storage section. The image data acquisition section acquires a series of image data groups including a timevarying element of a subject under examination. The variation detecting section detects a variation of the varying element in the series of image data groups. The selecting section selects a desired image data group out of the image data groups on the basis of the variation detected by the detecting section. The storage section stores the desired image data selected by using the selecting section.

According to the image processing apparatus of the present invention, the selection and extraction of the desired image data group from the image data groups is controlled in accordance with the variation of the varying element. This permits easy and quick selection of a proper image data group.

BRIEF DESCRIPTION OF THE DRAWINGS

FIG. 4 is a flowchart of an operation of the apparatus of FIG. 3;

FIG. 12B is an illustration of the console of FIG. 12A;

FIG. 14 is a diagram for explaining registration flags of the apparatus of FIG. 12A;

FIG. 15 is a diagram for explaining time positions of images in a heartbeat interval;

FIG. 16 shows an electrocardiographic waveform for explaining an operation of the apparatus of FIG. 12A;

FIGS. 17 and 18 are diagrams for explaining a relationship between registered images and saving ranges;

FIG. 19 and 20 are flowcharts of an image editing algorithm of the apparatus of FIG. 12.

DETAILED DESCRIPTION OF THE PREFERRED EMBODIMENTS

According to one of the several X-ray examination methods, X-ray moving fluoroscopic images are produced by the use of an image intensifier in an X-ray detector. Such X-ray moving images are effective for visual observation of the flow of blood in blood vessels. In this case, to contrast the flow of blood, a contrast medium having a low transmission factor for X-rays may be injected into the blood vessels.

According to such a blood-flow contrasting technique, so-called angiography, an operator can visually observe that the contrast medium injected into blood vessels outside the field of view of an image flows through the blood vessels to appear in the field of view and then flows out of the field of view. In saving such contrasted moving images in an image storage device, it is a usual practice to save images obtained prior to appearance of the contrast medium in the field of view and images obtained from when the contrast medium appears in the field of view and until when the contrast medium flows out of the field of view. The time it takes for the contrast medium to follow the course as described above will be several seconds. However, all the images acquired are not always needed for examination. In many cases, only a portion of the acquired images will be necessary.

Accordingly, in a first embodiment of the present invention, modality IEi and data base MDBi (i=1−m) are replaced by an image processing apparatus for automatically selecting necessary images from moving images involving varying components, such as X-ray moving images obtained by angiography.

Figure 3:
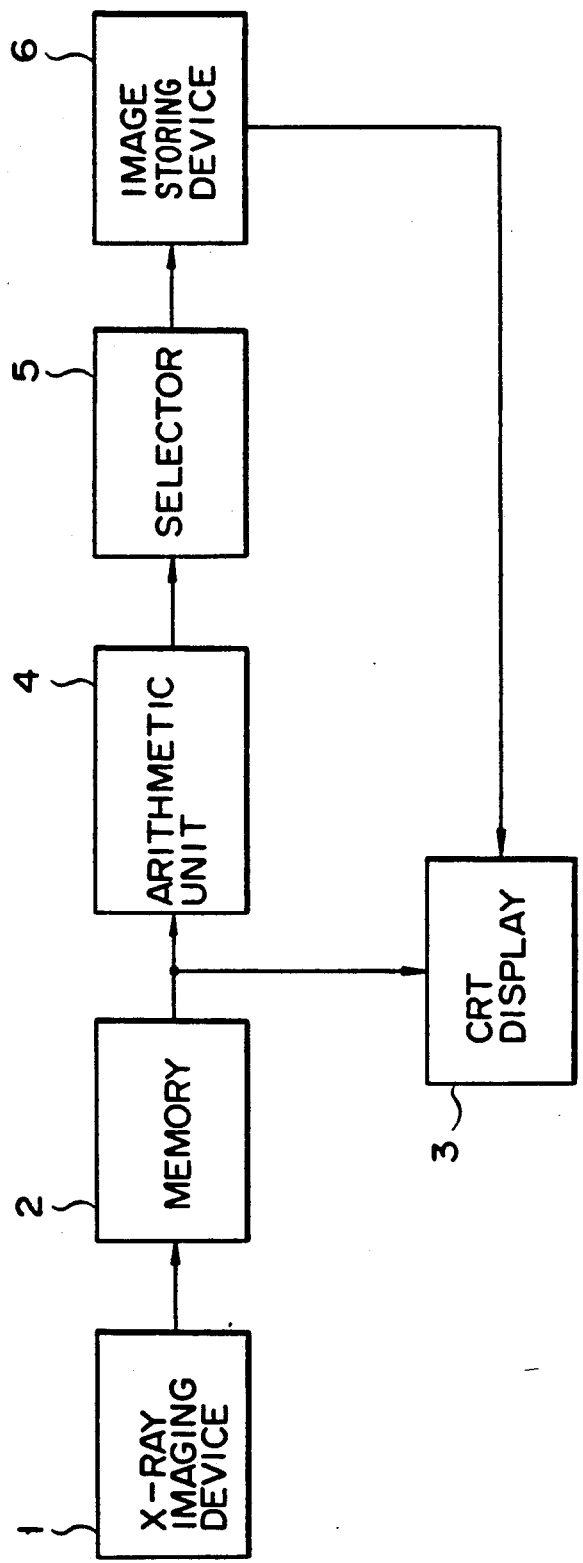
FIG. 3 is a block diagram of an image processing apparatus according to a first embodiment of the present invention.

As shown in FIG. 3, the image processing apparatus according to the first embodiment of the present invention comprises an X-ray imaging device 1, a memory 2, a CRT display 3, an arithmetic and logic unit 4 and a selector 5 which constitute modality IEi together, and an image storage device 6 which constitutes modality data base MDBi.

Moving images obtained by X-ray imaging device 1 are digitized and then temporarily stored in memory 2 in the form of a series of still images obtained during a period of time from the start of production of X-ray images until the completion thereof. Such a group of image data can be read from memory 2 as occasion arises and reproduced as moving images on CRT display 3 for visual observation. Arithmetic unit 4 reads out all the data stored in memory 2, chooses an image which has a maximum amount of variation in image information, for example, a maximum amount of an contrast medium in the field of view in the case of contrasted images, and determines the maximum value of the contrast medium and the number (No.) of the image having the maximum amount of the contrast medium. Selector 5 selects a previously specified number of images and determines the range of images to be saved on the basis of the maximum value determined by arithmetic unit 4. The images selected by selector 5 are saved in an image storage device, such as an optical disk unit.

FIG. 4 is a flowchart for outlining the operation of the first embodiment after the image data has been stored in memory 2. Specific operations of arithmetic processes in this flowchart will be described later. In the following description, it is assumed that moving images are produced when a contrast medium is injected.

First, in step ST1, subtraction is performed. Namely, subtraction is performed between two images for the same portion, one of which being a mask image in which no contrast medium exists in the field of view, and the other of which being a contrast image in which the contrast medium exists in the field of view. As a result of this subtraction process, portions with no variation between the mask and contrast images are excluded, and only portions showing a variation between the mask and contrast images remain for subsequent display. If subtraction is performed by using, as the mask image, an image prior to appearance of a contrast medium in the field of view and, as the contrast image, an image in which the contrast image exists in the field of view, then a subtraction image emphasizing the contrast medium only will be obtained.

Subsequently, in step ST2, a contrast-medium variation is regarded as a gradation variation, for example in the brightness of the entire image, and the brightness is calculated for each of images. The brightness is determined on the basis of a pixel value representing the brightness of each pixel in an image, and a sum S of pixel values of all the pixels that have a pixel value above a certain value is obtained. The sum S is used as a quantity indicative of the brightness of each image. The restriction of pixel values above a certain value is to exclude the influences of noises on low-value pixels. For example, only positive pixel values may be used.

Figure 5:
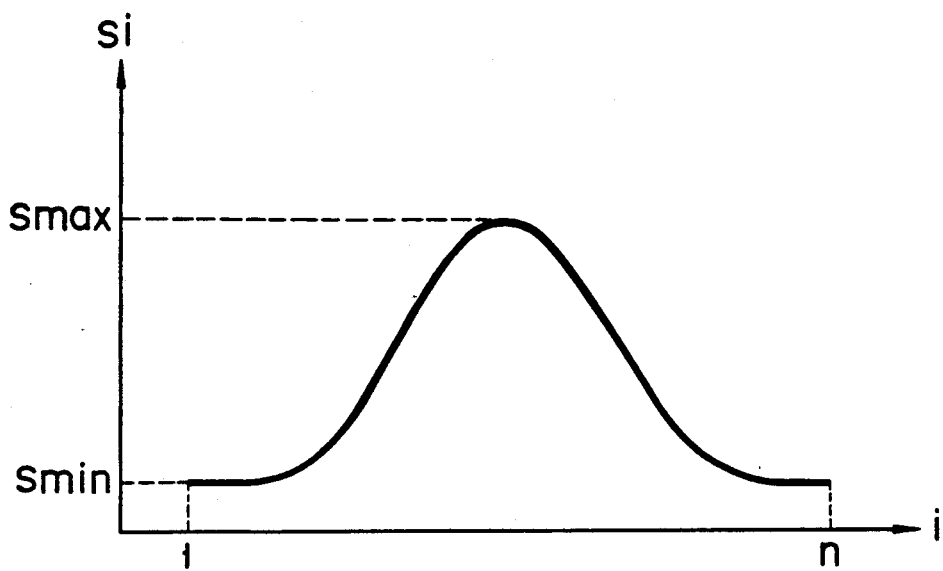
FIG. 5 shows a relationship between i and Si in the apparatus of FIG. 3.

In step ST3, an operation is performed for finding from all the images acquired, an image having a maximum sum S of pixel values and an image having a minimum sum S of pixel values. FIG. 5 diagrammatically shows a relationship between i and Si where Si is a sum of pixel values in the i-th image from the start of production of X-ray images. Here maximum and minimum values of the pixel-value sum Si are represented by Smax and Smin, respectively.

Figure 6:
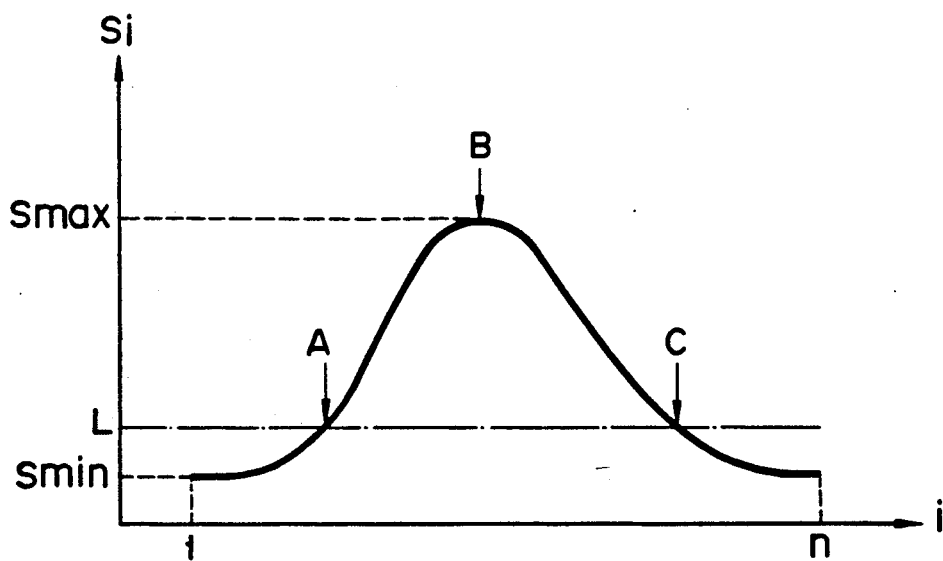
FIG. 6 shows a relationship among i, Si and L in the apparatus of FIG. 3.

In step ST4, an operation is performed for finding from all the images, an image whose, pixel-value sum S is to increase (corresponding to A in FIG. 6) and an image whose pixel-value sum S returns to a value prior to the start of increase (corresponding to C in FIG. 6).

These images correspond to an image obtained when the contrast medium first appears in the field of view and an image obtained when the contrast medium completely flows out of the field of view. The determination of the point in time when the contrast medium first appears in the field of view and the point in time when the contrast medium completely flows out of the field of view is performed on the basis of a relationship of magnitude between the sum S of pixel values and a threshold level L, which is previously determined, between the maximum value Smax and the minimum value Smin of the pixel-value sum. It is assumed that, in FIG. 6, a position A where Si first becomes larger than the threshold level L corresponds to the point in time when the contrast medium first appears in the field of view, and a position C where Si first becomes smaller than the threshold value corresponds to the point in time when the contrast medium completely flows out of the field of view. In FIG. 6, B represents the point in time when the pixel-value sum becomes the maximum value Smax. The threshold value L is given by $$L = a \times (Smax - Smin) + Smin \quad (1)$$

where $a$ is a predetermined constant ranging from 0 to 1.

In step ST5, a range of images to be saved is determined on the basis of the image A obtained when the contrast medium first comes into sight, the image B obtained when the amount of the contrast medium in the field of view becomes maximum, and the image C obtained when the contrast medium completely goes out of sight. There are several methods for the determination process and any method is at user's disposal.

Figure 7:
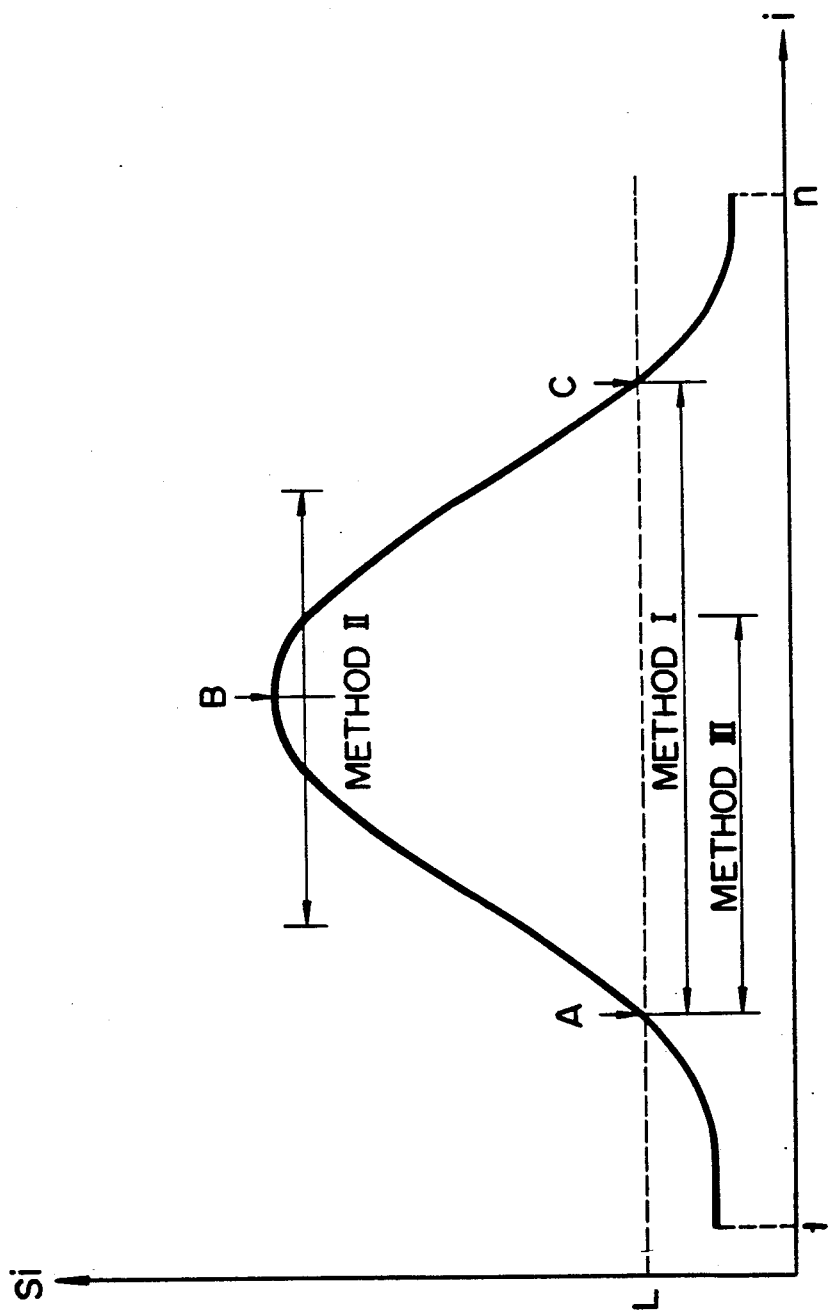
FIG. 7 is a diagram for explaining an image selecting method in the apparatus of FIG. 3.

For example, in FIG. 7, a method I saves all the images ranging from the position A where the pixel-value sum Si first exceeds the threshold level L to the position C where the pixel-value sum Si first falls below the threshold level L, a method II saves images obtained during a predetermined time period centered at position B or a predetermined number of images centered at the position B where the pixel-value sum Si becomes maximum, and a method III saves images obtained during a predetermined time period starting from position A or a predetermined number of images following the position A.

In step ST6, the images falling within a range determined by step ST5 are saved in image storage device 6.

Figure 8:
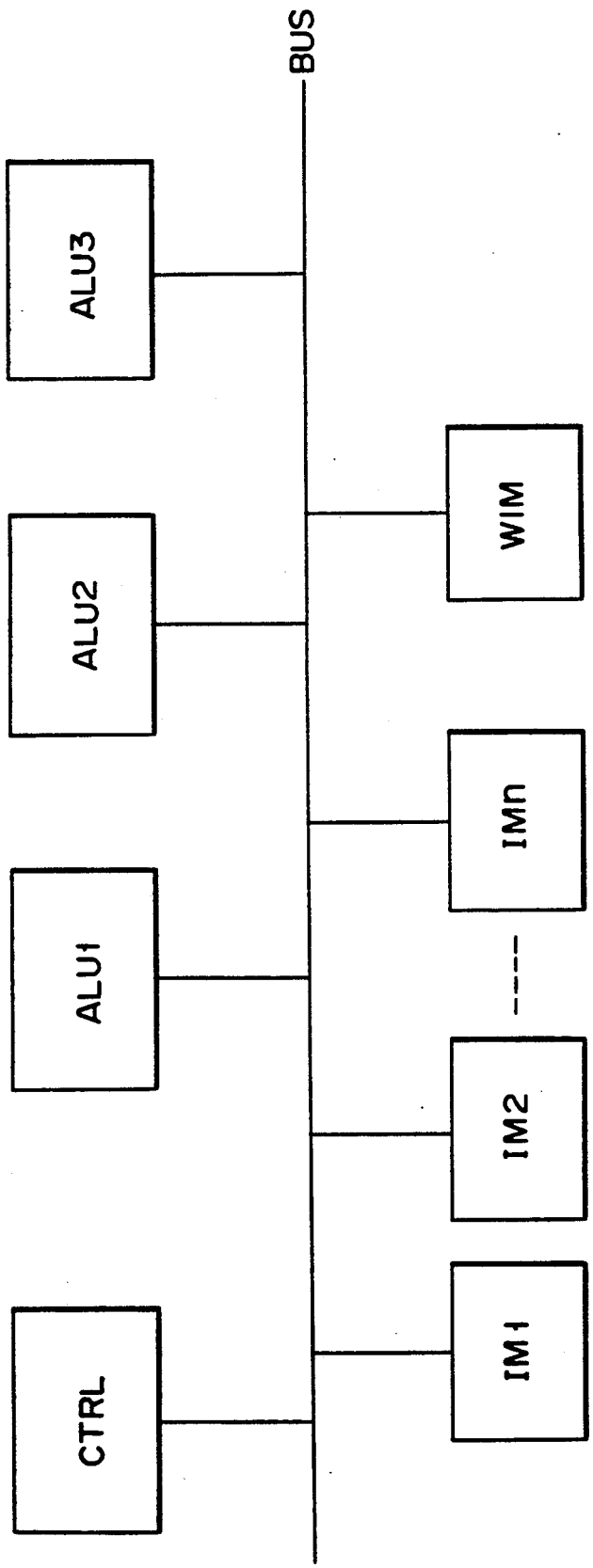
FIG. 8 shows an arrangement of a section which includes an arithmetic unit and a selector in the apparatus of FIG. 3.

FIG. 8 shows an arrangement of a section, including arithmetic unit 4 and selector 5, of the first embodiment. The section comprises a controller CTRL adapted to control the present system, image memories IM1-IMn for sequentially and temporally storing n images produced by the X-ray machine with one image stored in a corresponding memory, an arithmetic unit ALU1 for performing the subtraction of images, a working image memory WIM for temporarily storing an image resulting from the subtraction by ALU1 and an arithmetic unit ALU2 for calculating a sum Si of pixel values of each image, which together constitute arithmetic unit 4, and an arithmetic unit ALU3 for determining a range of images to be saved, which constitutes selector 5.

The specific arithmetic operations of the present invention will be described with reference to FIG. 8 hereinafter.

First, an operation is performed to obtain, by the use of a first image as a mask image and a second image as a contrast image, a subtraction image for the second image. Image data stored in image memories IM1 and IM2 is entered into arithmetic unit ALU1 for subtraction (IM1−IM2), and the result of subtraction is transferred to working image memory WIM. Next, the subtraction image data is read from working image memory WIM to be entered into arithmetic unit ALU2. Arithmetic unit ALU2 calculates a sum S2 of pixel values having a value above 0 in the subtraction image and holds the calculation result in its own register. Subsequently, the subtraction process is performed for each of the third to n-th images stored in image memories IM3 to IMn, and sums S3-Sn of pixel values are obtained for the third to n-th subtraction images. The results held in arithmetic unit ALU2 are entered into arithmetic unit ALU3 to determine an image in which the contrast medium first comes into sight and an image in which the contrast medium completely goes out of sight. The results provided by arithmetic unit ALU2 are searched for an image having a maximum value Smax of the pixel-value sum Si and an image having a minimum value of the pixel-value sum Si. It is assumed that the image having the maximum sum of pixel values is the k-th image ($2 \leq k \leq n$) and the image having the minimum sum is the l-th image ($2 \leq l \leq n$). Next, as shown in the flowchart of FIG. 4, an image whose sum Si of pixel values first exceeds the threshold value L and an image whose sum Si of pixel values first falls below the threshold level L are determined. First, the threshold value L is found. By putting $a = 0.2$, expression (1) is rewritten as follows:

$$L = 0.2 \times (Smax - Smin) + Smin \quad (2)$$

Figure 9B:
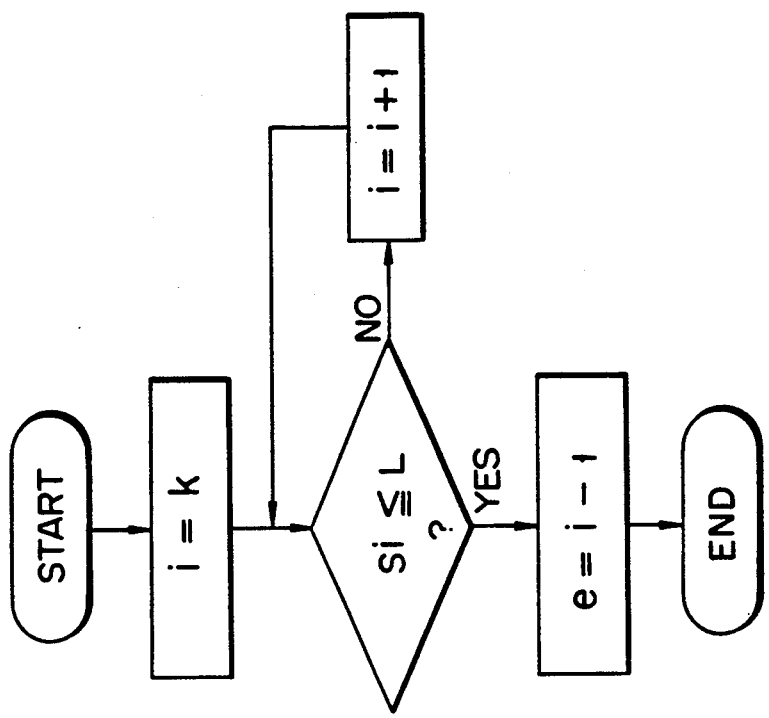
FIGS. 9A and 9B are flowcharts for explaining an operation for determining the presence or absence of a contrast medium in a field of view in the apparatus of FIG. 3.
Figure 9A:
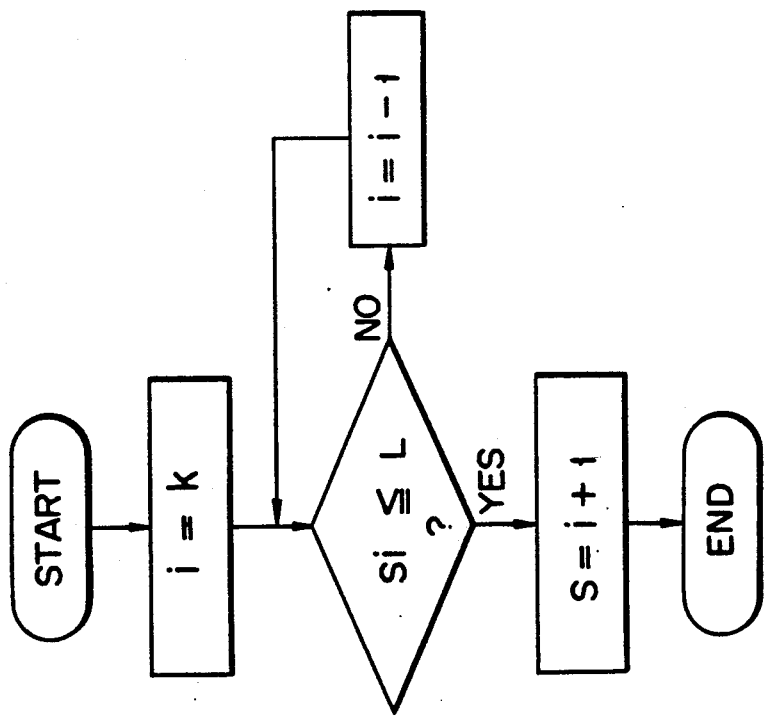

As shown in FIG. 9A, a search is made from the k-th image to the first image for an image whose sum Si of pixel values first falls below the threshold value L. Namely, an image (the s-th image) immediately following this image has a pixel-value sum Si which first exceeds the threshold value L.

Subsequently, as shown in FIG. 9B, a search is made from the k-th image to the last image for an image whose Si falls below the threshold value. Namely, an image (the e-th image) immediately preceding this image has a pixel-value sum Si which first falls below the threshold value L. It is assumed that the s-th and e-th images are the image obtained at a point of time when the contrast medium first comes into sight and the image obtained at a point of time when the contrast medium goes out of sight, respectively.

In this invention, the arithmetic operations may be performed by using another arithmetic unit. For example, in a second embodiment of the present invention, a histogram operation unit is used in place of arithmetic unit ALU2.

Figure 10:
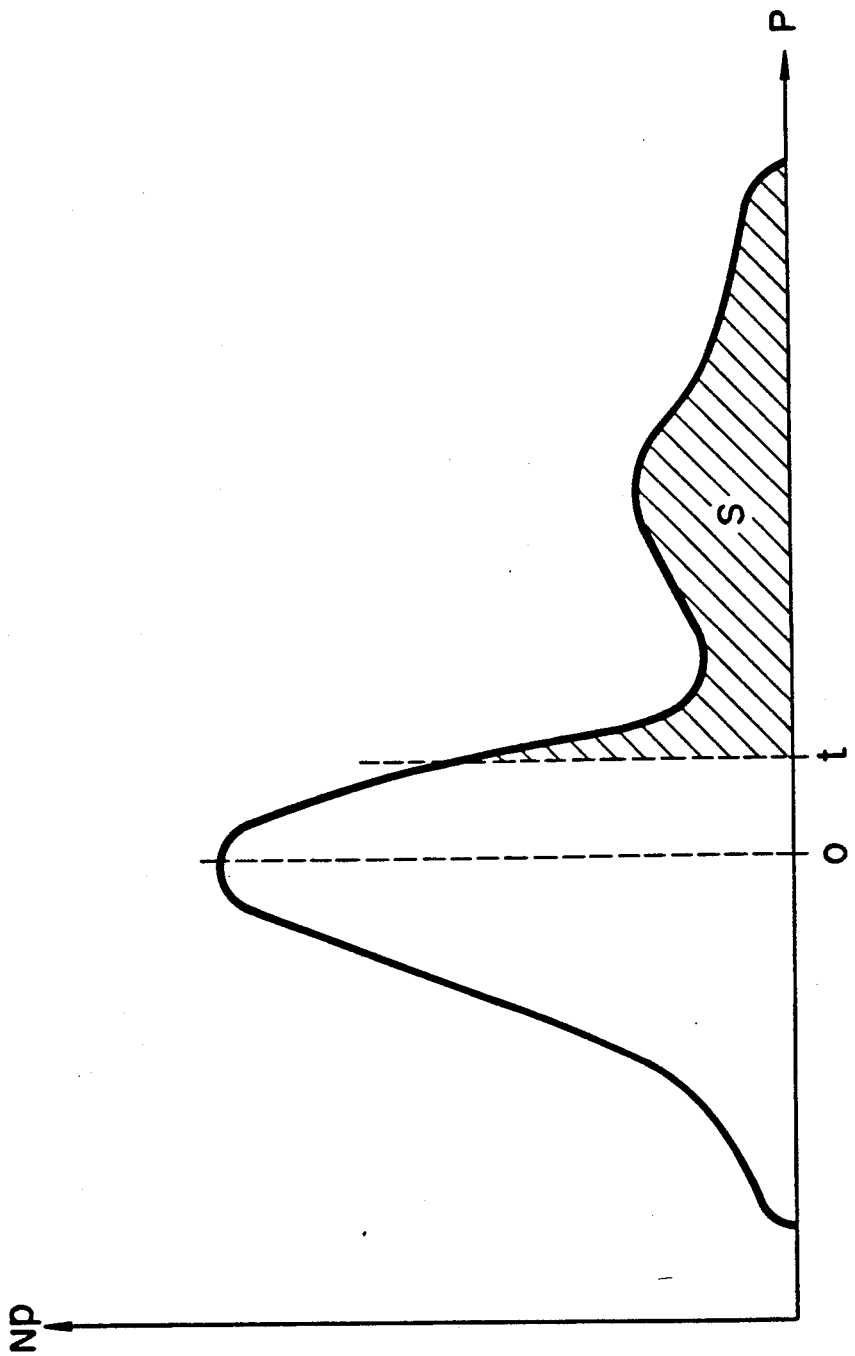
FIG. 10 is a diagram for explaining a method of an arithmetic operation in an image processing apparatus according to a second embodiment of the present invention.

An operation method used in the second embodiment of the present invention will be described with reference to FIG. 10. As shown in this Figure, by using the histogram operation unit in place of arithmetic unit ALU2, the correspondence of a pixel value P to the number Np of pixels having the pixel value P can be obtained for each of images. Thus, by determining a threshold pixel value t, it is possible to obtain the sum of pixel values equal to or larger than t in each of images in accordance with an expression given by $$S = \sum_{P=t}^{Pmax} (P \times Np) \quad (3)$$

According to this method, since the number of pixels can be found for each of pixel values, the necessary pixel values influenced by the contrast medium and many other pixel values due to background noises can be found. This allows a threshold pixel value to be determined so as to obtain images free from unnecessary components.

To produce contrasted moving images of the heart which moves vigorously as compared to other internal organs and changes its shape from instant to instant, if an image obtained at a certain instant were used as a mask image, emphasizing the contrast medium only would become difficult in the subtraction process. Therefore, according to a third embodiment of the present invention, mask images are produced over a period of time equal to or more than one heartbeat interval, and a mask image and a contrast image which represent corresponding, similar conditions of the heart are used for subtraction, thereby enabling distinct moving images to be obtained.

Figure 11:
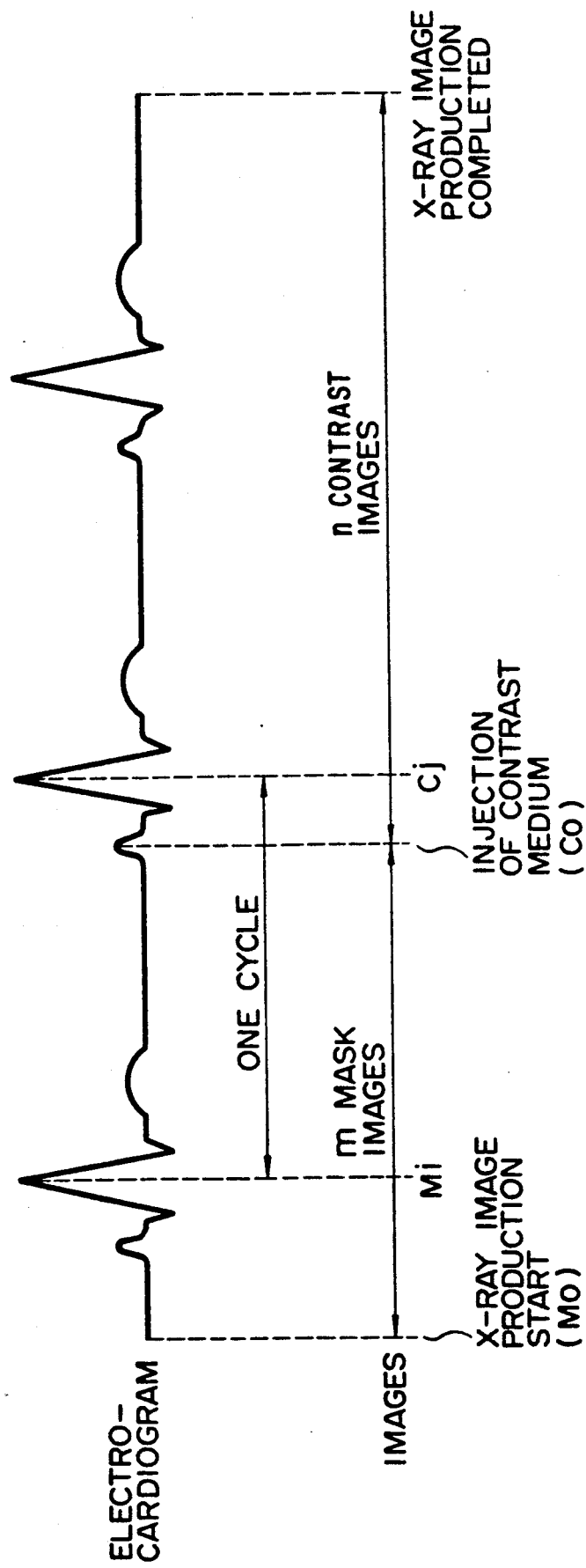
FIG. 11 is a diagram for explaining a processing method in an image processing apparatus according to a third embodiment of the present invention.

An image processing method according to the third embodiment of the present invention will be described with reference to FIG. 11.

An electrocardiogram is taken simultaneously with moving images, and an examination is previously made of positions on the electrocardiogram to which the moving images correspond. Prior to injection of the contrast medium, m images M0, M1, ..., Mm, which serve as mask images, are produced during a period of time equal to or more than one heartbeat interval. After the injection of the contrast medium, n images C0, C1 ..., Cn are produced which serve as contrast images. If the j-th contrast image Cj and the i-th mask image Mi have on the electrocardiogram, a time difference of just one heartbeat cycle, for example, then the two images may be considered to be in the same condition with respect to the shape of the heart. In this case, the subtraction of Mi−Cj is performed. As described above, by producing mask images during a time period not less than one heartbeat cycle and performing, with the aid of the electrocardiogram, the subtraction of mask and contrast images which correspond to each other in the condition of the heart, it is possible to obtain distinct images which are not affected by the pulsation of the heart. Either a phonocardiogran signal or a cardiogram signal may be used, instead of the electrocardiogram signal.

By the way, medical moving images particularly for a heart are often displayed on a endless basis because the image motion itself involves a large quantity of diagnostic information. Namely, in the case of the endless display, the first image of a series of moving images is again displayed immediately after the last image is displayed. However, if a series of moving images designated as described above were displayed on an endless basis, the image display would become very difficult to observe because the first image and the last image are often not continuous with respect to the phase of the heart activity.

Accordingly, a fourth embodiment of the present invention is directed to an image processing apparatus which permits an endless display which is excellent in continuity.

Figure 12A:
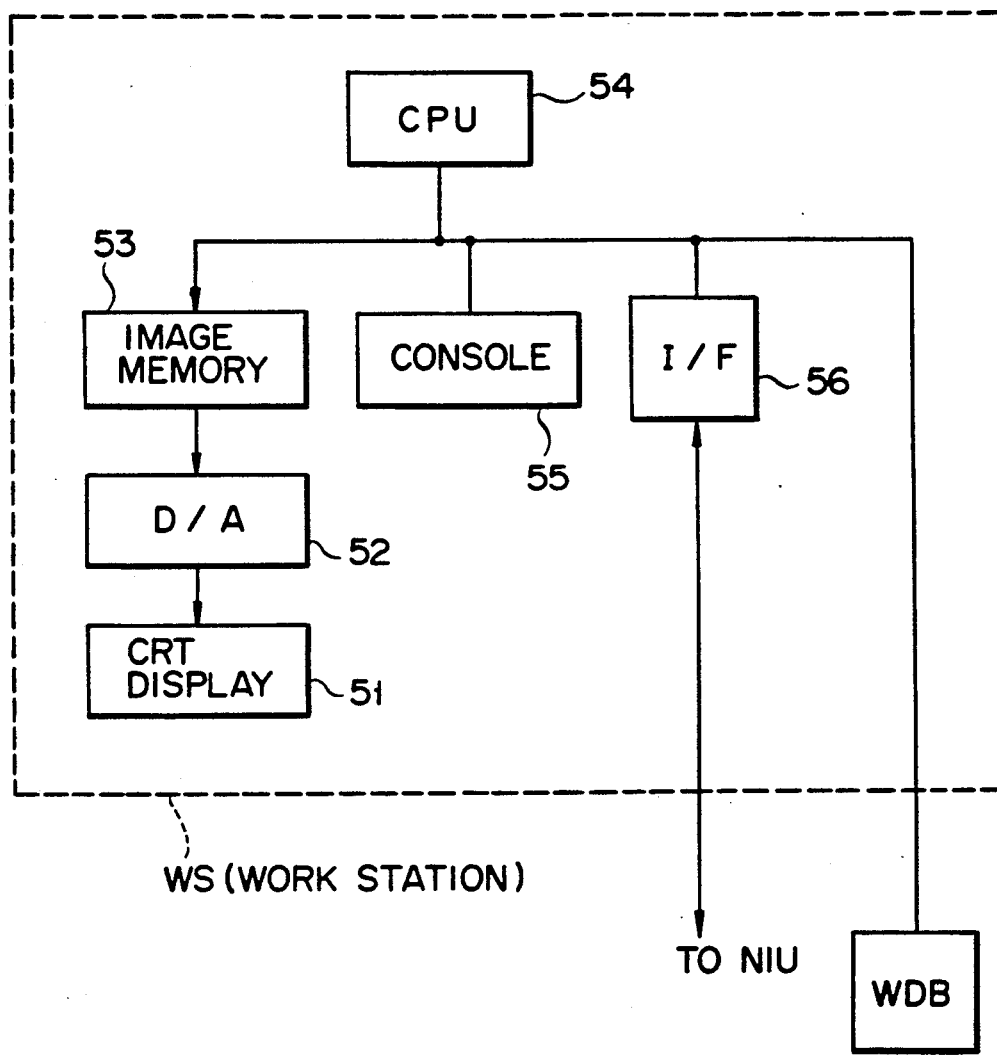
FIG. 12A is a block diagram of an image processing apparatus according to a fourth embodiment of the present invention.

FIGS. 12A and 12B show an image processing apparatus according to the fourth embodiment of the present invention. The embodiment shows a case where the present invention is applied to the work station of the PACS. As shown in FIG. 12A, the apparatus comprises a CRT display 51, a D/A (digital-to-analog) converter 52, a image memory 53, an CPU (central processor unit) 54, a console 55 and an interface 56.

Figure 1:
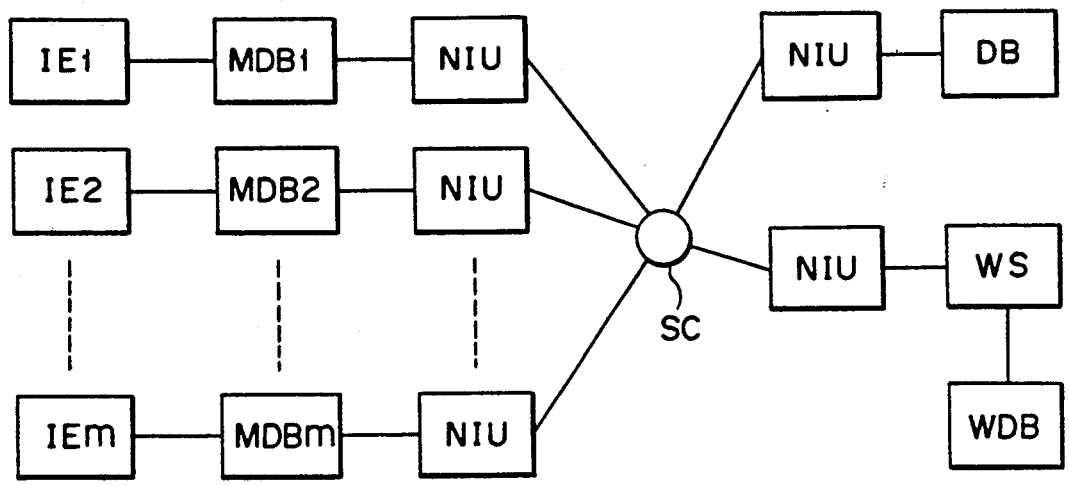
FIG. 1 is a block diagram of an example of the PACS.
Figure 2:
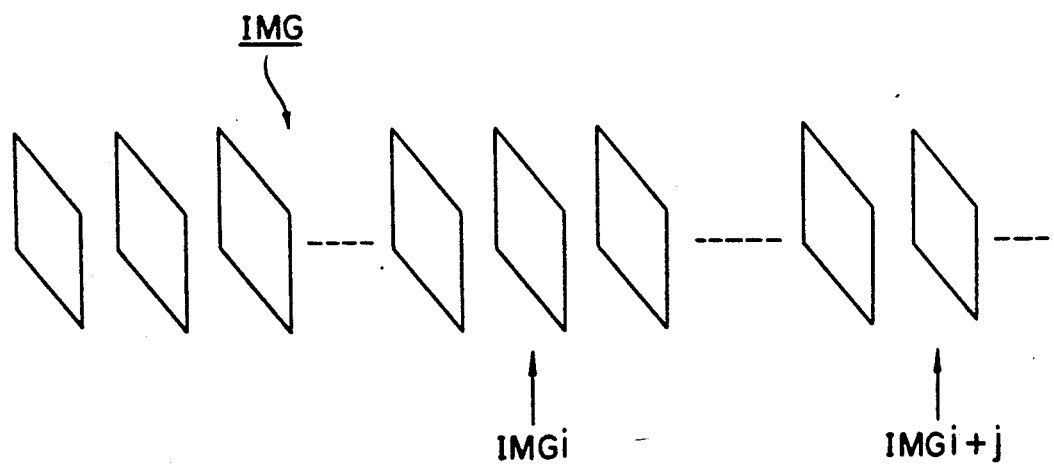
FIG. 2 is a diagram for explaining an operation for specifying images to be saved in an existing system.

Console 55 is adapted to receive various operation instruction signals from an operator. The entered instruction signals can be recognized by CPU 54. CPU 54 controls the operations of the apparatus. The selection of images in the present invention is functionally realized by this CPU 54. Image memory 53 stores a plurality of images which are specified through console 55. The images are fed to CRT display 51 through D/A converter 52. CRT display 51 visually displays the images applied thereto. Interface 56 interchanges image data with network interface NIU of FIG. 1. Work station data base WDB stores a series of images entered through interface 56. The images stored in work station data base WDB are appropriately transferred to image memory 53 under the control of CPU 54.

Next, a layout of keys on console 55 will be described with reference to FIG. 12B. As shown, console 55 includes a heart-phase continuity key 58, a movingimage display "forward" key 59, a moving-image display "backward" key 60, a forward key 61, a backward key 62, a registration key 63, a cancellation key 64, a registered-image display "forward" key 65, a registeredimage display "backward" key 66, an edit and save "1" key 67 an edit and save "2" key 68 and other keys 69.

When forward key 61 is depressed, CRT display 51 is switched to display the next image which is continuous with an image being displayed thereon.

When backward key 61 is depressed, CRT display 51 is switched to display an image immediately preceding an image being displayed thereon.

When moving-image display "forward" key 59 is depressed, a lamp mounted thereon is lit, and a forward and continuous switching display of a series of moving images is performed on an endless basis (moving-image display). When this key 59 is again depressed, the lamp is put out, and an image, which was displayed at the instant of depression of the key, is continuously displayed (still-image display).

When moving-image display "backward" key 60 is depressed, the moving-image display and still-image display are performed as is the case with the depression of key 59. However, this is different from the case of depression of key 59 in that the continuous switching display is performed backward.

When heart-phase continuity key 58 is depressed, a lamp provided thereon is lit, and the present apparatus enters a heart-phase continuous display mode, in which case, as the last image of moving images is displayed, an image is selected which is continuous with the first image with respect to the heart phase. Therefore, in this mode of moving-image display, the motion of the heart can be observed continuously and endlessly. Such a heart-phase continuous display mode can be realized, as shown in FIG. 15, by an image selection control based on data representing time-positions of images in one heartbeat interval. That is, assuming that the heartbeat cycle is T and the time when the n-th image is produced is tn, the time-position of the n-th image (n=0, 1, 2 ...) in the heartbeat cycle will be given by $$(tn - t0) / T$$

See FIG. 16. The value tn may be any point of time in the heartbeat cycle. By selecting an image which is nearest the first image as the last image on the basis of such data, it is possible to render the first and last images of a series of images continuous with respect to the heartphase. This image selection is performed by CPU 54.

When heart-phase continuity key 58 is depressed again, the mode is cancelled.

Figure 13:
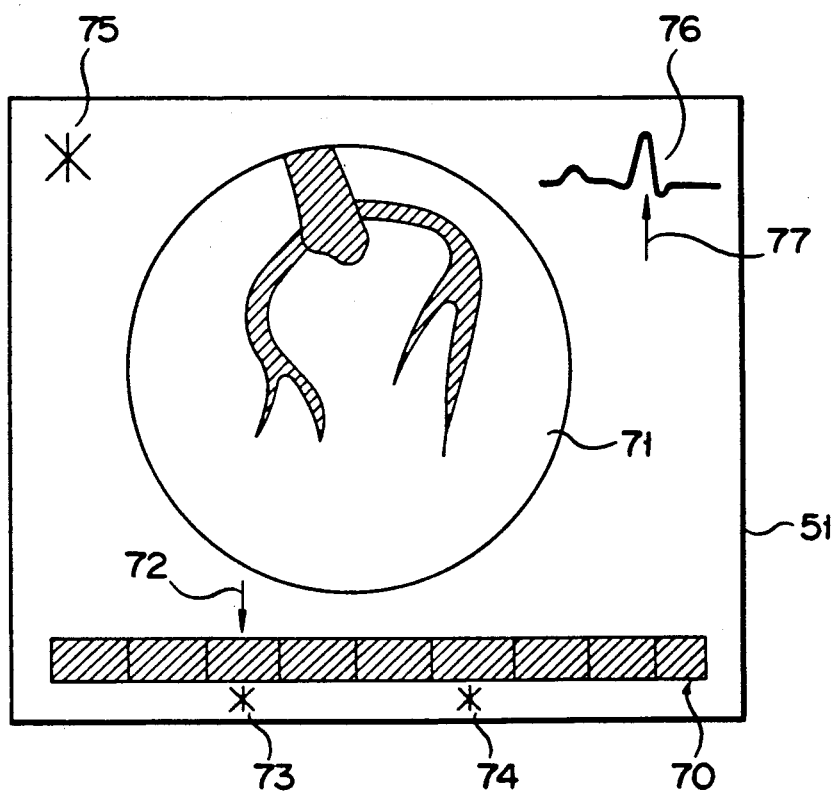
FIG. 13 shows a display example of the apparatus of FIG. 12 A.

When registration key 63, shown in FIG. 12B, is depressed, the image which was displayed at the instant of depression of key 63 is registered as "an image to be saved". This registration is carried out, as shown in FIG. 14, by setting a registration flag "1" to the number (No.) of a pertinent image. This registration control is realized by CPU 54. In addition, as shown in FIG. 13, when key 63 is depressed, a mark (*) 75 representing that the presently displayed image 71 has been registered is displayed in the upper left hand corner of the display screen. In FIG. 13, reference numeral 70 denotes a scale which indicates the position of the presently displayed image 71 in a series of images. The position of the displayed image 71 can be found by scale 70 and an arrow 72. Marks (*) 73 and 74 representing registration are simultaneously displayed below scale 70. Mark 73 indicated by arrow 72 corresponds to mark 75, and mark 74 represents the previous registration.

When cancellation key 64 is depressed, the registration flag "1" of the presently displayed image is reset to "0", and, at the same time, marks 73 and 74 of FIG. 13 are put out.

When registered-image display "forward" key 65 is depressed, a registered image, which is nearest the presently displayed image in the forward direction, is displayed on CRT display 51. Each time key 65 is depressed, the next forward registered image is displayed. Such a display control is performed by CPU 54.

When registered-image display "backward" key 66 is depressed, the registered-image switching display is performed as is the case with the depression of "forward" key 65. However, this is different from the case of depression of key 65 in that the direction for switching display is reversed.

When edit and save key "1" key 67 is depressed, a set of continuous images, which include all the registered images and are continuous with respect to the heartphase, are transferred to network data base DB (FIG. 1) to be saved therein.

When edit and save key "2" key 68 is depressed, many sets of continuous images, which include a plurality of registered images and are continuous with respect to the heart-phase, are transferred to network data base DB to be saved therein. Other keys 69 include alphabet keys, kana (the Japanese syllabary) keys, ten keys and so on. The image designation is performed through these keys 69.

The function of the apparatus constructed as above will now be described.

Figure 21:
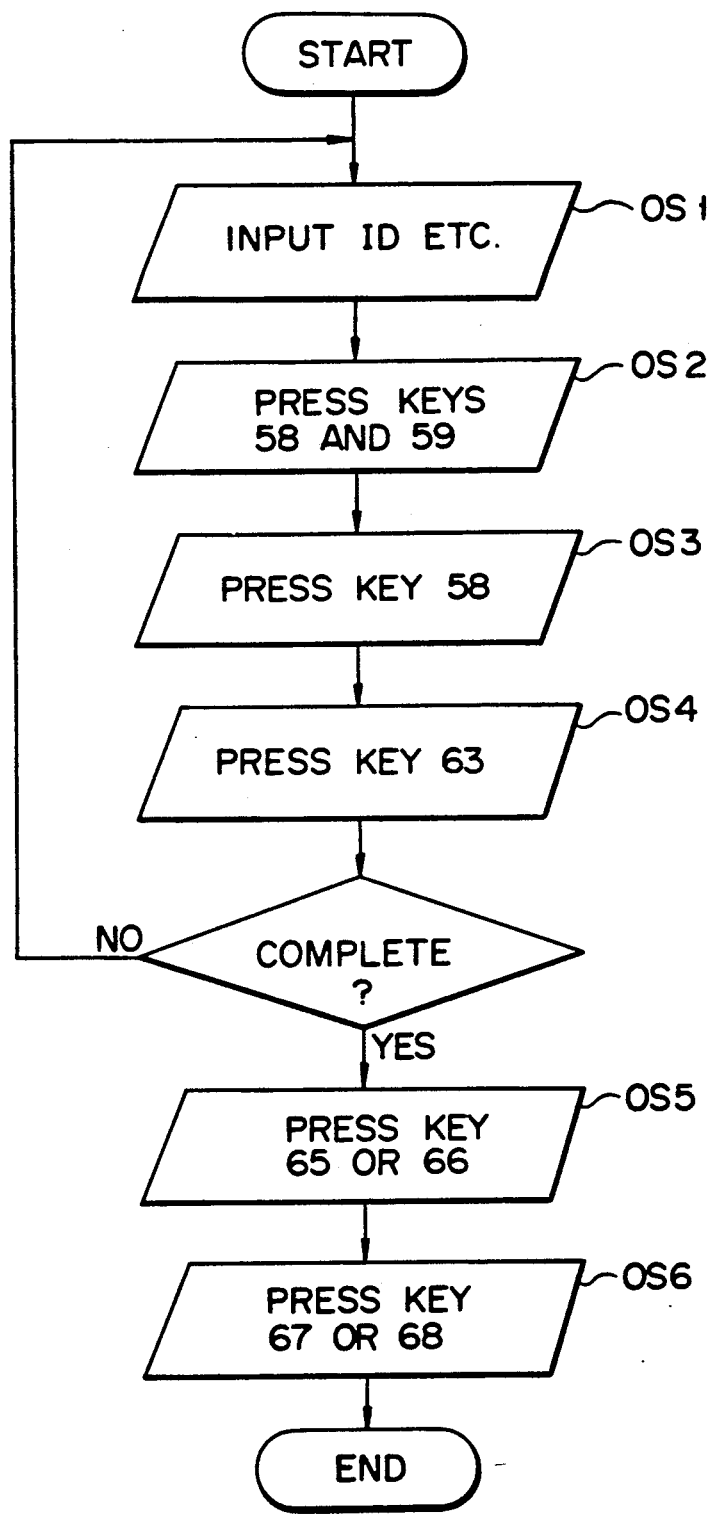
FIG. 21 is a flowchart showing an operational procedure of the apparatus of FIG. 12A.

It is assumed that a series of images to be examined have already been transferred to work station data base WDB via the star network and network interface NIU. A flowchart indicating the procedure of operations to be conducted by an operator, or a doctor at this stage is shown in FIG. 21.

When the operator enters the ID number of a patient through console 55 (step OS1), relevant images are transferred from work station data base WDS to image memory 53 under the control of CPU 54. Here it is assumed that the transferred images are X-ray contrasted images of coronary arteries of the heart of the patient and include the electrocardiogram data.

The first image of the image group stored in image memory 53 is transferred via D/A converter 52 to CRT display 51 for display thereon under the control of CPU 54 (see FIG. 13).

When the doctor depresses heart-phase continuity key 58 and moving-image display "forward" key 59 in step OS2, the serial images are sequentially read out from image memory 53 and then displayed as moving images under the control of CPU 54. In this moving-image display, as shown in FIG. 13, an arrow 77, pointing to an electocardiogram waveform 76 to indicate the heartphase of the presently displayed image 71, moves from left to right as the moving-image display progresses. Arrow 72, located above scale 70 to indicate the position of the presently displayed image 71 on the scale, also moves from left to right as the display progresses. In this case, in spite of the fact that the moving images are displayed endlessly, no discontinuity will be noticed because of the continuity of images in the heart-phase due to the previous depression of heartphase continuity key 58.

When an image of interest appears during the observation of moving images, the doctor depresses movingimage display "forward" key 59 again in step OS3. As a result, the display screen is fixed at an image displayed at a time when key 59 is depressed. When the image of interest cannot be easily found, forward key 61 or backward key 62 may be used to locate and display the desired image. Next, the doctor determines whether the relevant image is to be saved or not and depresses registration key 63 when the image should be saved (step OS4). Thus, marks (*.) 73 and 75 indicating registration are displayed on the display screen, and a registration flag "1" is set to the image number of the presently displayed image 71 (see FIG. 14) under the control of CPU 54, completing the registration of image 71.

The doctor repeats switch operations in steps OS2 to OS4 as often as needed.

Next, to display the registered images again for the purpose of making an examination report, the doctor has only to depress registered-image display "forward" key 65 or registered-image display "backward" key 66. By depressing key 65, it is possible to sequentially display the registered images only. Further, the depression of key 66 will allow the registered images to be sequentially displayed in the backward direction. This display control is carried out by CPU 54. By this display control, images needed for making an examination report can be displayed again easily and quickly.

If there is a registered image to be cancelled, then the doctor may depress cancellation key 64 when the relevant image is displayed. As a result, the registration flag for the image is reset to "0", cancelling the registration of the image.

The registered images can be saved by depressing edit and save key "1" key 67 or edit and save key "2" key 68 (step OS6). When edit and save key "1" key 67 is depressed, images to be saved, including all the registered images, are edited in such a way that the first and last images are continuous with respect to the heart-phase, and the edited images are transferred to network data base DB (FIG. 1) to be saved therein under the control of CPU 54. That is, as shown in FIG. 17, where each of image groups A and B for one heartbeat cycle include a registered image or images, all the images ranged from the first image of the group A to the last image of the group B are to be saved. (The first image of the group A and the last image of the group B are continuous with respect to the heart-phase.) Between the first image of the group A and the last image of the group B, image groups for a predetermined number of heartbeat cycles may be added for subsequent saving.

When there are a plurality of registered images, it is desirable to depress edit and save "2" key 68 in order to effectively, utilize network data base DB. For example, as shown in FIG. 18, when image groups A2 and B2 each include a registered image or images, image groups A1 and A3 before and behind image group A2 will be saved along with image group A2, and image groups B1 and B3 before and behind image group B2 will be saved along with image group B2. In addition, the first image of group A1 and the last image of group A3; the last image of group A3 and the first image of group B1; the first image of group B1 and the last image of group B3; and the last image of group B3 and the first image of group A1 are continuous with respect to the heart-phase.

Figure 20:
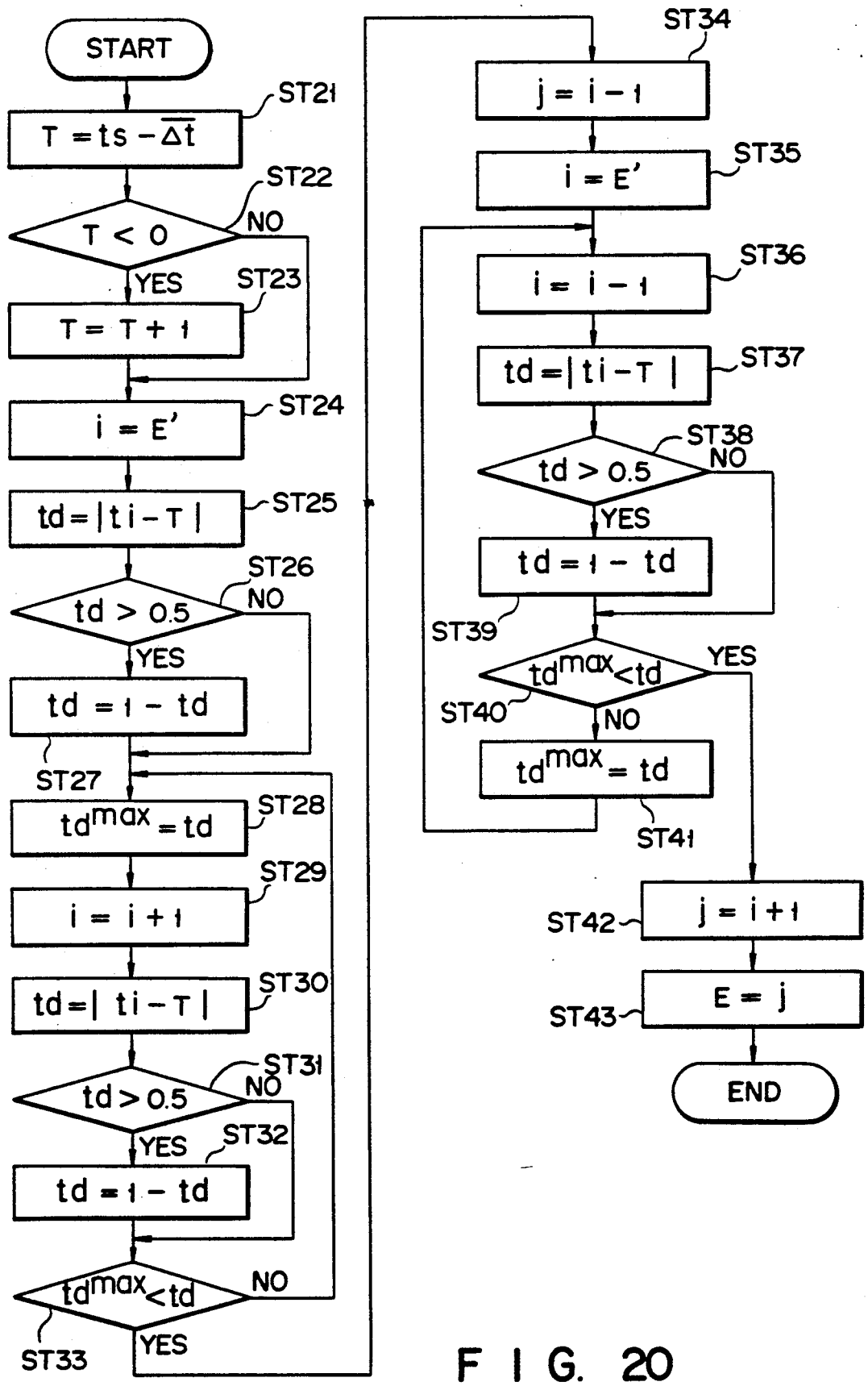

Subsequently, the image editing process will be explained with reference to the flowcharts of FIGS. 19 and 20. The image editing process is performed by CPU 54.

First, the doctor enters the image number N of a desired image and the heart rate M through the keys of key group 69 in steps ST11 and ST12. N and M are each a positive integer. After recognizing N and M, CPU 54 calculates an average value of a difference between relative positions of two adjacent images in a heartbeat cycle in step ST13. Assuming the average value to be $\overline{\Delta t}$, $(1/\overline{\Delta t})$ images are involved in a heartbeat cycle on an average. Next, CPU 54 finds the image number S of the first image involved in images to be saved. The number S can be calculated from an expression given by $$S = M - \{(N/2) \times (1/\overline{\Delta t})\}$$

Further, CPU 54 estimates the number of the last image in an image group to be saved in step ST15. Here it is assumed that the estimated number is E'. E' can be calculated as follows:

$$E' = S + \{N \times (1/\overline{\Delta t})\}$$

Subsequently, CPU 54 finds the correct number E of the last image on the basis of the estimated number E'.

If the first image number S and the last image number E are found, then an image group to be saved can be specified. That is, the image group to be saved is comprised of images corresponding to the image numbers S and E and all the images lying between S and E.

Next, an algorithm for finding the image number E in step ST16 will be described.

On the assumption that the relative position of the first image number S is ts, a difference T between ts and $\overline{\Delta t}$ is obtained in step ST21. A determination is made as to whether T<0 in step ST22. When T<0, T is incremented by one in step ST23. In step ST24, i is set to E', the estimated value of the last image number. When the determination in step ST22 is negative, the step ST24 is next performed. In step ST25, an absolute value td of a difference between ti and T is obtained. A decision is made as to whether td>0.5 in step ST26. When td>0.5, 1−td is set as td in step ST27. The value td is regarded as tdmax in step ST28. When the determination in step is negative, the step ST28 is next performed. In step ST29, i is incremented by one. In step ST30, an absolute value td of a difference between ti and T is obtained. A decision is made as to whether td>0.5 in step ST31.

When td>0.5, 1 - td is set as td in step ST32. A decision is made as to whether tdmax<td in step ST33. When the determination in step ST31 is negative, the step ST33 is next performed. When tdmax<td in step ST33, i is decremented by one and the result is set as j in step ST34. E' is set as i in step ST35, and i-1 is set as i in step ST36. In step ST37, an absolute value td of a difference between ti and T is obtained. A decision is made as to whether td>0.5 in step ST38. When td>0.5, 1−td is set as td in step ST39. A decision is made as to whether tdmax<td holds or not in step ST40. When the determination in step ST38 is negative, the step ST40 is next performed. When the in step ST40, the td at that time is set as tdmax in step ST41 and the operation returns to step ST36. When the condition in step ST40 exists, i+1 is set as j in step ST42, and j is set as E in step ST43. This E corresponds to the correct number in step ST16 (FIG. 19).

As described above, according to the image processing apparatus of the present invention, when a desired image is specified by the use of ten keys in key group 69, a series of moving images including the specified image are selected by CPU 54 in such a way that the first and last images are continuous with respect to the heart-phase. Therefore, the endless display of these images will provide good continuity and will be easily observed. Of course, not only one desired image but also, several, desired images may be selected by the ten keys in key group 69. Further, by depressing edit and save "1" key 67 or edit and save "2" key 68, it is also possible to save a group of images which includes specified images and in which the first and last images are continuous with respect to the heart-phase.

Either a phonocardiogram signal or a cardiogram signal may be used, instead of the electrocardiogram signal.

The present embodiment is not limited to the work station of the PACS. Images to be processed may be others than those of the heart. In the case where images to be processed include body portions which move with respiration, a respiration signal may be used in a similar fashion for permitting the respiration phase to have continuity.

Although the preferred embodiments of the present invention have been disclosed and described, it is apparent that other embodiments and modifications are possible.

What is claimed is:

1. An apparatus for selecting images of a patient and automatically storing desired images, said apparatus comprising:
    means for producing an image of a patient;
    means for acquiring a plurality of time-varying images of portions of the patient including images representing the patient before and after a contrast medium is injected into said portion of the patient;
    means for performing a subtraction between said plurality of images to produce a plurality of time-varying subtraction images which enhance portions of the images corresponding to the portions of the patient into which said contrast medium is injected;
    means for summing pixel values of each of said plurality of time-varying subtraction images to provide summed values;
    selecting means for selecting a number of said plurality of time-varying subtraction images to be stored according to said summed values provided from said summing means; and means for storing said subtraction images selected by said selecting means.

2. An image processing apparatus according to claim 1, wherein said acquiring means includes an X-ray image device which irradiates the patient with X-rays.

3. An image processing apparatus according to claim 2, wherein said contrast medium is injected into blood vessels of the patient.

4. An image processing apparatus according to claim 1, wherein said selecting means selects a predetermined subset of images from said plurality of time-varying subtraction images, including a first image which has a maximum summed value determined by said pixel summing means, a second image acquired prior to said first image, and a third image acquired subsequent to said first image.

5. An image processing apparatus according to claim 1, wherein said selecting means selects a predetermined number of images for said plurality of time-varying subtraction images subsequent to a first image in which said summed values determined by said pixel summing means exceed a predetermined value.

6. An image processing apparatus according to claim 1, wherein said selecting means selects a group of continuous images from said plurality of time-varying subtraction images which begins with a first image in which said summed value determined by said pixel summing means exceeds a first predetermined value and ends with a last image in which said summed value determined by said pixel summing means is below a second predetermined value.

7. An image processing apparatus according to claim 1, wherein said selecting means selects a subset of images from said plurality of time-varying images when said summed values determined by said pixel summing means fall within a predetermined range of values.

8. An image processing apparatus according to claim 1, wherein said subtraction means obtains a subtraction image by subtracting a mask image from a contrast image.

9. An image processing apparatus according to claim 8, wherein said mask image and said contrast image correspond to a similar phase of a cyclic body motion of the patient.

10. An image processing apparatus according to claim 1, further comprising means for detecting an electrocardiogram signal.

11. An image processing apparatus according to claim 1, further comprising means for detecting a phonocardiogram signal.

12. An image processing apparatus according to claim 1, further comprising means for detecting a respiration signal.

13. An apparatus for selecting images of a patient and automatically storing desired images, said apparatus comprising:

means for producing an image of a patient;

means for acquiring a plurality of time-varying images of portions of the patient including images representing the patient before and after a contrast medium is injected into said portions of the patient;

means for performing a subtraction between said plurality of images to produce a plurality of time-varying subtraction images which enhance portions of the images corresponding to the portions of the patient into which said contrast medium is injected;

means for summing pixel values of each of said plurality of time-varying subtraction images to provide summed values;

selecting means for selecting a number of said plurality of time-varying subtraction images to be stored according to said summed values provided from said summing means; and means for storing said subtraction images selected by said selecting means;

wherein said selecting means includes means for inputting an operator's designation of an image data group, wherein said selecting means selects said image data group such that a first image and a last image of said image data group are continuous with respect to the phase of a cyclic body motion of the patient, and wherein said selecting means selects said image data group nearest a designated range of summed values.

* * * * *